Patented Feb. 9, 1937

2,069,836

UNITED STATES PATENT OFFICE 2,069,836

MONOAZO DYESTUFFS AND THEIR PRODUCTION

Arthur Howard Knight, Blackley, Manchester, England, assignor to Imperial Chemical Industries Limited, a corporation of Great Britain No Drawing. Application April 30, 1935, Serial No. 19,103. In Great Britain May 3, 1934

9 Claims. (Cl. 260—96)

A. This invention relates to the manufacture of water-soluble monoazo dyestuffs useful in the dyeing of cellulose acetate, wool, natural or artificial silk, tin-weighted silk, nitrocellulose lacquers, spirit stains, varnishes, and inks.

B. An object of the invention is to produce new and useful dyestuffs by an economically and technically satisfactory process. Another object of the invention is to find alternative processes which can be used for the manufacture of the dyestuffs of this invention. Yet another object of the invention is to disclose means of obtaining the intermediates used in the manufacture of the dyestuff. Other objects of the invention will be in part apparent and in part hereinafter more fully set forth.

C. The objects of the invention are obtained by coupling a diazotized paranitroamine of the benzene series free from sulfonic acid and carboxylic acid groups with an N-sulfatoethyl-N-beta-alkoxyethyl or with an N-sulfatopropyl-N-beta-alkoxyethyl derivative of an amine of the benzene series having a free coupling position. By an alternative process forming a part of this invention I manufacture the new dyestuffs by first manufacturing water-insoluble dyestuffs by coupling a diazotized para-nitroamine of the benzene series devoid of sulfonic or carboxylic acid groups with an N-hydroxyethyl-N-beta-alkoxyethyl or with an N-hydroxy-propyl-N-beta-alkoxyethyl derivative of an amine of the benzene series having a free coupling position, and by thereafter treating the said water-insoluble dyestuffs with an agent, for example concentrated sulfuric acid, adapted to convert the hydroxyethyl or hydroxypropyl group to its sulfuric ester.

D. The N-sulfatoethyl-N-beta-alkoxyethyl and N-sulfatopropyl-N-beta-alkoxyethyl derivatives used as coupling components for the preparation of the new water-soluble dyestuffs are obtained by treating the corresponding N-hydroxyalkyl-N-beta-alkoxyethyl derivatives with chlorosulfonic acid in a solvent such as tetrachlorethane, removing the solvent, and dissolving the sulfato acid so obtained in aqueous alkali.

E. The N-hydroxyethyl-N-beta-alkoxyethyl- and N-hydroxypropyl-N-beta-alkoxyethyl-derivatives which are used for the preparation of the sulfato components of the water-soluble dyestuffs or as coupling components for the water-insoluble dyestuffs may be obtained in a variety of ways. They may be obtained by condensing an N-beta-alkoxyethylaniline with ethylene or propylene chlorhydrin or with an alkylene oxide (e. g. ethylene oxide). They may also be prepared by condensing an N-mono-hydroxyethyl or N-monohydroxy-propylaniline with a beta-chloroethylalkyl ether or a toluene-para-sulfonic-beta-alkoxyethyl ester.

F. The new water-soluble dyestuffs have good affinity for acetate artificial silk when applied from an acid, neutral or alkaline dyebath and according to the invention I employ them for the dyeing and printing of materials consisting of or containing acetate artificial silk. They produce colorations of good light fastness and dischargeability.

G. The new dyestuffs are also suitable for the dyeing and printing of wool, silk and tin-weighted silk, and for the dyeing of leather and according to the invention I employ them for these purposes.

H. They also possess good solubility in alcohol and nitrocellulose solvents coupled with high tinctorial value, and by a further feature of the invention I employ them for coloring nitrocellulose lacquers, spirit stains and varnishes, and in preparing quick-drying inks.

I. The invention is illustrated but not limited by the following examples, in which the parts are by weight.

Example I 138 parts of para-nitroaniline are diazotized in the usual way and the diazo solution added during about a quarter of an hour to a solution containing 325 parts of the sodium salt of N-sulfatoethyl-N-beta-ethoxyethyl-meta-toluidine and 208 parts of sodium carbonate in 4000 parts of water at 5° C. When combination is complete the dyestuff, which separates from solution, is filtered off and preserved as paste or dried in any suitable way.

The dyestuff is soluble in hot water and dyes acetate silk from a neutral or alkaline bath containing 3% salt in scarlet shades of good fastness properties and dischargeability. It can also be applied for the direct printing of acetate artificial silk.

The dyestuff, when applied from an acid bath, possesses good affinity for wool, natural silk and tin-weighted silk, dyeing these materials in red shades.

N-sulfatoethyl-N-beta-ethoxyethyl-meta-toluidine is obtained by treating one molecular proportion of N-beta-hydroxy-ethyl-N-beta-ethoxyethyl-meta-toluidine with one molecular proportion of chlorosulfonic acid in tetrachloroethane solution. N-beta-hydroxyethyl-N-beta-ethoxyethyl-meta-toluidine is obtained by condensing N-beta-hydroxyethyl-meta-toluidine with ethyl-beta-chloroethyl ether in the presence of an acid binding agent such as sodium carbonate. It is a pale yellow liquid, B. P. 180° C./12 mm.

Example II 69 parts of sodium nitrite are added to 1480 parts of 100% sulfuric acid and stirred until no solid remains, then 222 parts of 6-chloro-2, 4-dinitroaniline are added to this with stirring during two hours and stirring continued until no solid remains. The resulting liquid is then heated to 50° C. for two hours and then cooled to 20° C. It is then added slowly with good agitation to a cooled solution containing 325 parts of the sodium salt of N-sulfatoethyl-N-beta-ethoxyethyl-meta-toluidine and 136 parts of sodium acetate in 4000 parts of water. Ice is added from time to time during coupling to keep the temperature of the aqueous medium at 0°–5° C. and 40% aqueous caustic soda is added at such a rate that the coupling medium is at no time during coupling acid to Congo red paper and more than faintly alkaline to Clayton yellow paper. When all the sulfuric acid solution has been added the dyestuff suspension is made faintly alkaline with caustic soda and heated to 80° C. when the dyestuff is transformed into a tar. The liquor is poured off, the dyestuff tar washed with water and then dried in any suitable way.

It is soluble in hot water and dyes acetate artificial silk from a neutral or alkaline bath in bluish-violet shades of good fastness properties and dischargeability.

J. The invention is further illustrated by reference to the examples of the following table:—

| Example | Diazo component | Coupling component | Shade on acetate artificial silk |
|---|---|---|---|
| 3 | Para-nitroaniline | N-sulfatoethyl-N-beta-methoxyethyl-aniline. | Scarlet-red. |
| 4 | Ortho-chloro-para nitroaniline. | do | Crimson-red. |
| 5 | do | N-sulfatoethyl-N-beta-ethoxyethyl-meta-toluidine. | Crimson-red (bluer than Example 4) |
| 6 | 2,4-dinitroaniline | do | Reddish-violet. |
| 7 | do | N-sulfatoethyl-N-beta-methoxyethyl-meta-amino-para-cresol-methyl ether. | Violet. |
| 8 | 6-chloro-2,4-dinitroaniline. | do | Reddish-blue. |

K. By reacting equimolecular proportions of N-beta-hydroxyethylaniline and toluene-para-sulfo-beta-methoxyethyl ester for several hours at 125° C. in the presence of sodium carbonate followed by ether extraction of the reaction mixture, evaporation of the ether and distillation in vacuo, N-beta-hydroxyethyl N-beta-methoxy-ethylaniline is obtained as a pale yellowish oil, B. P. 181–183° C./15 mm. The above hydroxyethyl compound is then converted to N-sulfato-ethyl N-beta-methoxy-ethylaniline by sulfation by the method described in Example I.

L. N-hydroxyethyl N-beta-methoxyethyl-meta amino-para-cresol-methyl ether (yellowish oil, B. P. 192–194° C./18 mm.) is similarly obtained and converted to its sulfuric ester.

M. As an illustration of the alternative method of preparing the water-soluble dyestuffs of the invention, the following example is given.

Example IX

The water-insoluble dyestuff obtained by coupling 46 parts of diazotized 2, 4-dinitroaniline with 56 parts of N-beta-hydroxyethyl N-beta-ethoxyethyl-meta-toluidine is added slowly and with stirring as a dry powder to 370 parts of sulfuric acid monohydrate. Stirring is continued for several hours. The solution so obtained is then poured into 1000 parts of ice and 250 parts of water. After stirring for a short time the free acid of the new sulfate dyestuff separates from solution and is filtered off. The filter paste is then mixed with 1500 parts of water and made alkaline to Clayton yellow paper by addition of aqueous caustic soda. The resulting sodium salt of the new sulfato dyestuff separates and is filtered off, washed with a little 5% brine and either kept as a paste or dried.

The new dyestuff has similar dyeing properties to the chemically equivalent dyestuff of Example 6.

N. Advantages of the invention are the production of new dyestuffs by satisfactory alternative processes. Other advantages of the invention arise from the nature of the particular dyestuffs, from their wide applicability, and from the readiness with which they may be prepared. Yet other advantages will be apparent to persons skilled in the art.

O. As many apparently widely different embodiments of this invention may be made without departing from the spirit and scope thereof, it is to be understood that I do not limit myself to the specific embodiments thereof except as defined in the appended claims.

I claim:

1. The method of making a dyestuff which comprises coupling a diazotized para-nitroamine of the benzene series to a compound having the formula

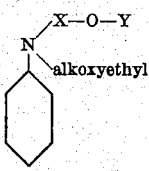

in which X refers to one of a group consisting of ethyl and propyl, and Y refers to one of a group consisting of H and SO₃H.

2. A composition of matter represented by the formula

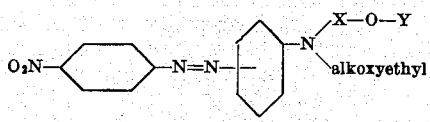

in which X refers to one of a group consisting of ethyl and propyl, and Y refers to one of a group consisting of H and SO₃H.

3. In the manufacture of a dyestuff the process which includes in one step sulfating the group

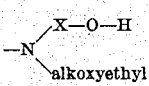

in which X is one of a group consisting of ethyl and propyl, and in another step diazotizing and coupling to a compound having the formula

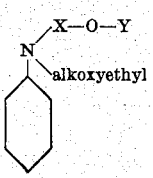

in which Y is one of a group consisting of H and SO₃H, a diazotized para-nitroamine of the benzene series.

4. A process for the manufacture of new water-soluble monoazo dyestuffs which comprises coupling a diazotized para-nitroamine of the benzene series with one of a group of compounds consisting of an N-sulfatoethyl-N-beta-alkoxyethyl- and an N-beta-sulfatopropyl-N-beta-alkoxyethyl derivative of an amine of the benzene series having a free coupling position, the resulting dyestuffs being devoid of carboxylic and sulfonic acid groups.

5. A process for the manufacture of new water-soluble monoazo dyestuffs which comprises converting water-insoluble dyestuffs, obtained by coupling a diazotized para-nitroamine of the benzene series with one of a group of compounds consisting of an N-hydroxy-ethyl-N-beta-alkoxyethyl and N-hydroxypropyl-N-beta-alkoxyethyl derivative of an amine of the benzene series having a free coupling position, into their sulfuric esters.

6. A process for the manufacture of new water-soluble monoazo dyestuffs which comprises converting water-insoluble dyestuffs, obtained by coupling a diazotized para-nitroamine of the benzene series with one of a group of compounds consisting of an N-hydroxy-ethyl-N-beta-alkoxyethyl and N-hydroxypropyl-N-beta-alkoxyethyl derivative of an amine of the benzene series having a free coupling position, into their sulfuric esters by treatment with concentrated sulfuric acid.

7. The compound formed by the coupling of diazotized para-nitroaniline and N-sulfatoethyl-N-beta-ethoxyethyl-meta-toluidine.

8. The dyestuff represented by the formula:

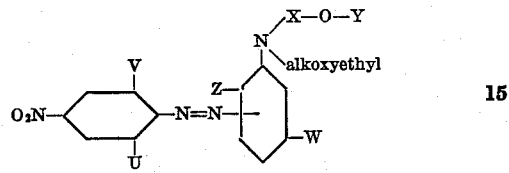

in which U is one of a group consisting of H, Cl, and NO₂, V is one of a group consisting of H and Cl, W is one of a group consisting of H and CH₃, X is one of a group consisting of ethyl and propyl, Y is one of a group consisting of H and SO₃H, and Z is one of a group consisting of H and OCH₃.

9. The dyestuff formed by coupling diazotized 6-chloro-2,4-dinitroaniline with N-sulfatoethyl-N-beta-ethoxyethyl-meta-toluidine.

ARTHUR HOWARD KNIGHT.